No. 679,750. Patented Aug. 6, 1901.
C. HOFFMANN.
TRUCK.
(Application filed Jan. 16, 1901.)
(No Model.)
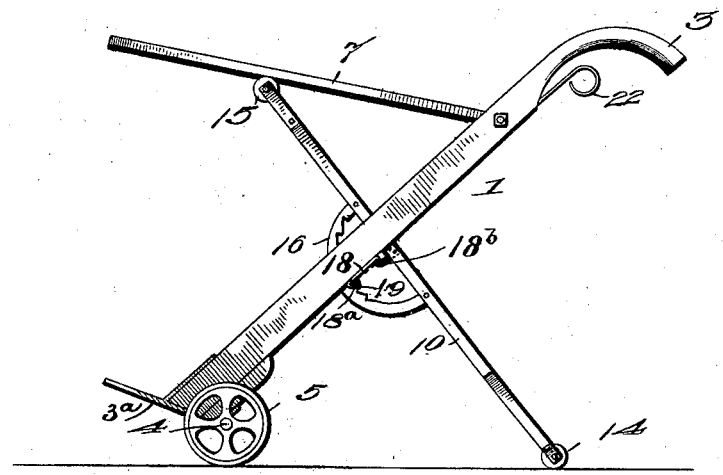
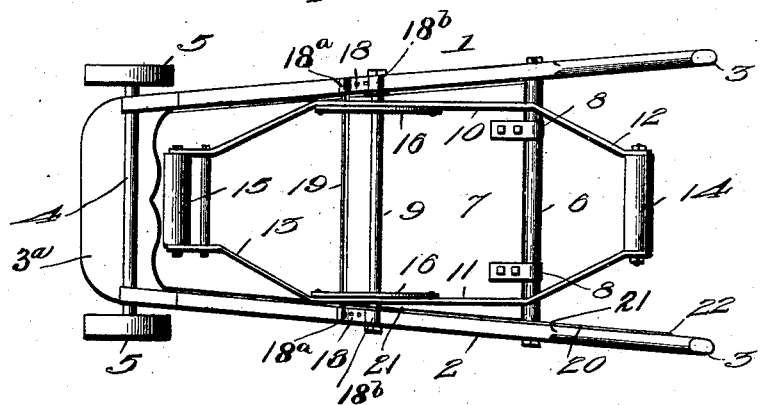
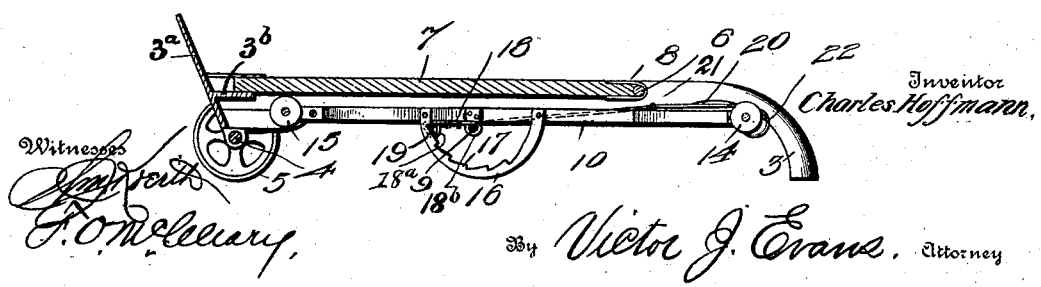
Witnesses
Inventor
Charles Hoffmann,
By Victor J. Evans, Attorney

UNITED STATES PATENT OFFICE.

CHARLES HOFFMANN, OF SANDUSKY, OHIO.

TRUCK.

SPECIFICATION forming part of Letters Patent No. 679,750, dated August 6, 1901.

Application filed January 16, 1901. Serial No. 43,535. (No model.)

*To all whom it may concern:*

Be it known that I, CHARLES HOFFMANN, a citizen of the United States, residing at Sandusky, in the county of Erie and State of Ohio, have invented new and useful Improvements in Trucks, of which the following is a specification.

My invention relates to hand-trucks; and its object is to provide a truck with a movable platform and improved means for adjusting the platform and supporting it in its adjusted position, whereby the load carried by the truck may be conveniently loaded upon a wagon or deposited at any desired place.

The construction of the improvement will be fully described hereinafter in connection with the accompanying drawings, which form a part of this specification, and its novel features will be defined in the appended claims.

In the drawings, Figure 1 is a side elevation of a hand-truck embodying the invention, the platform being shown in its elevated position. Fig. 2 is a reverse or bottom plan view of the truck, the platform being shown in lower position; and Fig. 3 is a longitudinal section of the same.

The reference-numerals 1 and 2 designate the side bars of the truck-frame, provided with the usual curved handles 3 and formed with bearings for an axle 4, upon which the wheels 5 are mounted.

$3^a$ is a shoe formed with a cross-plate $3^b$, providing a support for the forward end of the platform when the latter is in its normal position.

The bars 1 and 2 are connected adjacent to the handles 3 by a cross-bar 6, to which is pivotally secured a platform 7 by means of metallic straps 8, which are bent around the cross-bar 6 and securely bolted to the platform 7, as clearly illustrated in Fig. 2.

9 designates a rod secured to the bars 1 and 2 at about the center of their length, and upon this rod 9 is pivotally secured a rocking frame comprising side bars 10 and 11, the ends of which converge, as shown at 12 and 13, and are formed with bearings for rollers 14 and 15.

As illustrated in Fig. 1, when the rear end of the rocking frame is depressed its forward end is raised, and the contact of the roller 15, carried by the rocking frame, with the under surface of the platform 7 raises the latter, as clearly shown in Fig. 1, and consequently raises the bag or other load on said platform to a position where it may be readily moved onto a wagon, counter, or other place of deposit. When the frame is rocked to the position shown in Fig. 1, the lower roller 14 rests upon the floor or the ground, thus facilitating the moving of the truck from place to place.

Depending from each of the sides 10 and 11 of the rocking frame is a segmental bar 16, formed on its inner side with teeth 17, adapted to be engaged by a cross-bar 19, loosely mounted in the yokes $18^a$ at the forward end of brackets 18, which are provided with eyes or loops $18^b$ at their rear ends, whereby they are secured to the ends of the cross-bar 9. A pull-rod 20 is attached at one end to the cross-bar 19 and guided through keepers 21, projecting from the adjacent side bar of the frame, and terminates in a loop or finger-piece 22.

It will be apparent that the engagement of the cross-bar 19 with the teeth of the segment 16 will secure the platform 7 at any position to which it may be adjusted.

The invention as above described is applicable to any ordinary truck by removing the cross-bars thereof and securing the rocking frame between the side bars constituting the truck-frame.

I claim—

1. A hand-truck comprising a truck-frame; a rear cross-bar connecting the sides of said frame, between the handles, a cross-bar located at the forward end of the frame providing a platform-support, a platform pivotally secured to the rear cross-bar and adapted to be supported on the forward cross-bar; a rocking frame pivotally secured between the sides of the truck-frame and adapted to elevate said platform and support it from the ground and means for securing the rocking frame and the platform at desired elevation.

2. The combination with a frame of a hand-truck; of a cross-bar connecting the sides of said frame between the handles, a platform pivotally secured to said cross-bar, a rocking frame pivotally secured between the sides of the truck-frame; rollers mounted between the ends of said rocking frame; and means for securing the rocking frame and the platform at desired elevation.

3. The combination with a frame of a hand-truck; of a cross-bar secured to the sides of the frame between the handles; a platform pivotally secured to said cross-bar; a second cross-bar arranged parallel to the first-mentioned cross-bar; a rocking frame pivotally supported on said second cross-bar, rollers mounted between the ends of said rocking frame; and means for securing said rocking frame and the platform at desired elevation.

4. The combination with the frame of a hand-truck; of a platform pivotally supported between the sides of the frame; a rocking frame pivotally supported within the truck-frame below the platform, and having its ends converged; rollers mounted between the converged ends of the rocking frame; and means for securing the rocking frame in its adjusted position comprising toothed segments depending from the under sides of the rocking frame; brackets having yokes secured to the sides of the truck-frame, and a cross-bar mounted in the yokes and adapted to engage the toothed segments.

In testimony whereof I affix my signature in presence of two witnesses.

CHARLES HOFFMANN.

Witnesses:
BELLE RAMSAY,
H. L. NEEKE.